US012568349B2

(12) United States Patent
Kurtoglu et al.

(10) Patent No.: US 12,568,349 B2
(45) Date of Patent: Mar. 3, 2026

(54) NORM-FREE EVENT TRIGGERED INFORMATION EXCHANGE FOR DISTRIBUTED CONTROL OF MULTIAGENT SYSTEMS

(71) Applicant: UNIVERSITY OF SOUTH FLORIDA, Tampa, FL (US)

(72) Inventors: Deniz Kurtoglu, Tampa, FL (US); Tansel Yucelen, Tampa, FL (US); Stefan Ristevski, Tampa, FL (US); Jonathan Muse, Beavercreek, OH (US)

(73) Assignees: UNIVERSITY OF SOUTH FLORIDA, Tampla, FL (US); GOVERNMENT OF THE UNITED STATES AS REPRESENTED BY THE SECRETARY OF THE AIR FORCE, Wright Patterson AFB, OH (US)

( * ) Notice: Subject to any disclaimer, the term of this patent is extended or adjusted under 35 U.S.C. 154(b) by 628 days.

(21) Appl. No.: 17/948,160

(22) Filed: Sep. 19, 2022

(65) Prior Publication Data

US 2023/0085829 A1     Mar. 23, 2023

Related U.S. Application Data

(60) Provisional application No. 63/261,325, filed on Sep. 17, 2021.

(51) Int. Cl.
*H04W 4/46*          (2018.01)
(52) U.S. Cl.
CPC ..................................... *H04W 4/46* (2018.02)

(58) Field of Classification Search
CPC ...................................................... H04W 4/46
See application file for complete search history.

(56) References Cited

PUBLICATIONS

M. Franceschelli, M. Egerstedt, and A. Giua, "Motion probes for fault detection and recovery in networked control systems," in Proc. Amer. Centrol Conf., 2008, pp. 4358-4363. (Year: 2008).*
Zhongkui Li, Zhisheng Duan, Lihua Xie, Xiangdong Liu, "Distributed Robust Control of Linear Multi-Agent Systems with Parameter Uncertainties," airXIV (Year: 2011).*

(Continued)

*Primary Examiner* — Jay Khandpur
(74) *Attorney, Agent, or Firm* — HUSCH BLACKWELL LLP

(57) ABSTRACT

Methods and systems for information exchange of a vehicle in a multiagent system are disclosed. The methods and systems include: receiving one or more neighboring states broadcast by one or more neighboring vehicles; transmitting a last broadcast state of the vehicle to the one or more neighboring vehicles; determining a current state of the vehicle based on the one or more neighboring states and the last broadcast state; determining a norm-free information exchange triggering condition based on the last broadcast state, the current state, and an estimated command; and in response to the current state violating the norm-free information exchange triggering condition, transmitting the current state to the one or more neighboring vehicles. Other aspects, embodiments, and features are also claimed and described.

28 Claims, 7 Drawing Sheets

(56) References Cited

PUBLICATIONS

Wei Wang, Changyun Wen, Jiangshuai Huang, "Distributed adaptive asymptotically consensus tracking control of nonlinear multiagent systems with unknown parameters and uncertain disturbances," Elsevier (Year: 2014).*

Yildirim, Emre, et al. "On control of multiagent systems in the presence of a misbehaving agent." IEEE Control Systems Letters 4.2 (2019): 456-461.

Yildirim, Emre, et al. "Application of a distributed control approach to an aerial swarm with a misbehaving vehicle." AIAA Scitech 2021 Forum. 2021.

Yildirim, Emre, et al. "Control of multiagent networks with misbehaving nodes." International Journal of Systems Science 52.13 (2021): 2858-2874.

* cited by examiner

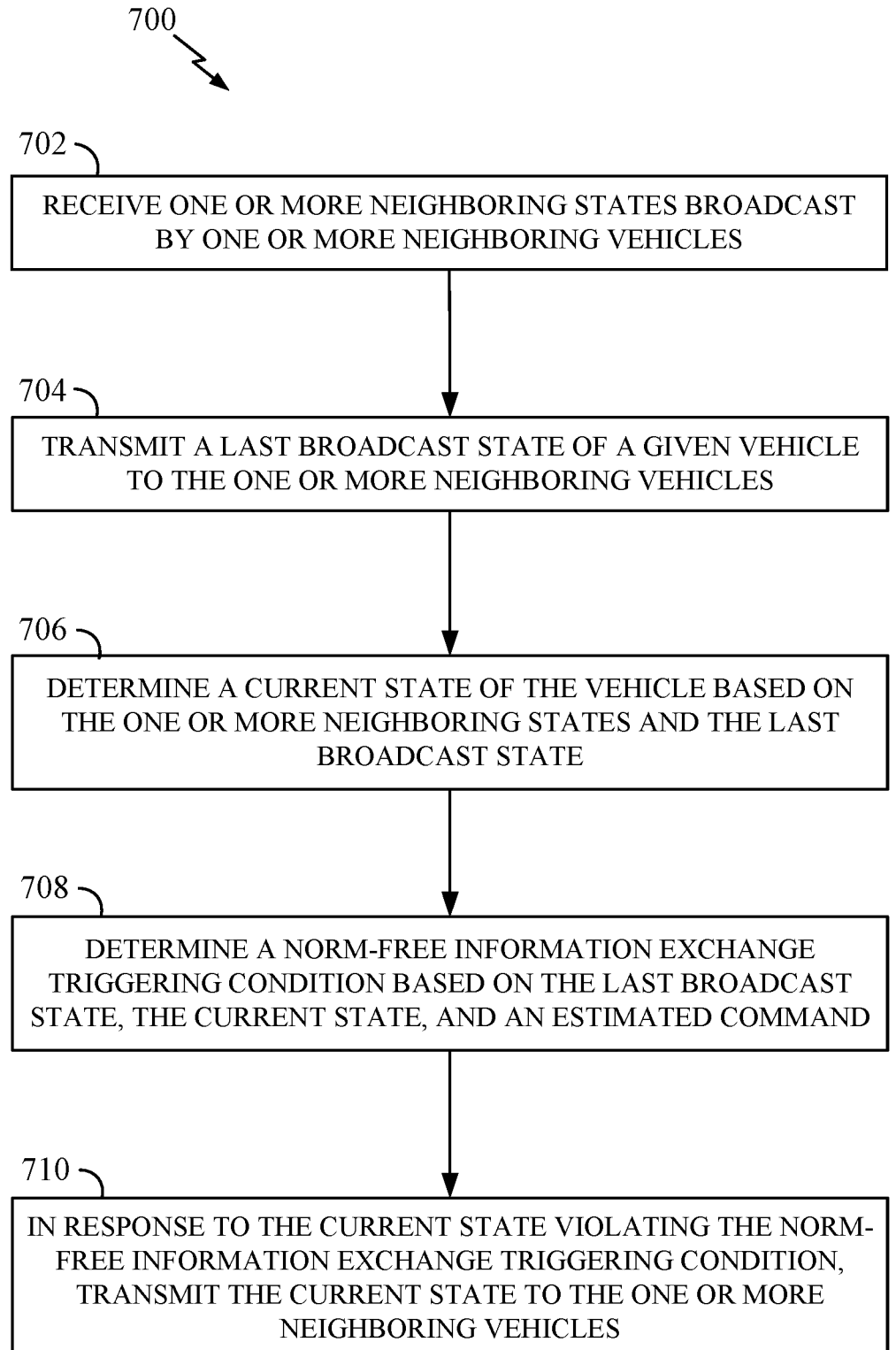

700

702
RECEIVE ONE OR MORE NEIGHBORING STATES BROADCAST
BY ONE OR MORE NEIGHBORING VEHICLES

704
TRANSMIT A LAST BROADCAST STATE OF A GIVEN VEHICLE
TO THE ONE OR MORE NEIGHBORING VEHICLES

706
DETERMINE A CURRENT STATE OF THE VEHICLE BASED ON
THE ONE OR MORE NEIGHBORING STATES AND THE LAST
BROADCAST STATE

708
DETERMINE A NORM-FREE INFORMATION EXCHANGE
TRIGGERING CONDITION BASED ON THE LAST BROADCAST
STATE, THE CURRENT STATE, AND AN ESTIMATED COMMAND

710
IN RESPONSE TO THE CURRENT STATE VIOLATING THE NORM-
FREE INFORMATION EXCHANGE TRIGGERING CONDITION,
TRANSMIT THE CURRENT STATE TO THE ONE OR MORE
NEIGHBORING VEHICLES

FIG. 7

NORM-FREE EVENT TRIGGERED INFORMATION EXCHANGE FOR DISTRIBUTED CONTROL OF MULTIAGENT SYSTEMS

CROSS-REFERENCE TO RELATED APPLICATION(S)

This application claims the benefit of U.S. Provisional Patent Application Ser. No. 63/261,325, filed Sep. 17, 2021, the disclosure of which is hereby incorporated by reference in its entirety, including all figures, tables, and drawings

STATEMENT REGARDING FEDERALLY SPONSORED RESEARCH

This invention was made with government support under the Universal Technology Corporation Grant 162642-20-25-C1 awarded by the Air Force Research Laboratory Aerospace Systems Directorate. The government has certain rights in the invention.

SUMMARY

The following presents a simplified summary of one or more aspects of the present disclosure, to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects of the present disclosure, methods, systems, and apparatus for information exchange of a vehicle in in a multiagent system are disclosed. These methods, systems, and apparatus can include steps or components for: receiving one or more neighboring states broadcast according to an undirected and connected graph topology by one or more neighboring vehicles; transmitting a last broadcast state of the vehicle to the one or more neighboring vehicles; determining a current state of the vehicle based on the one or more neighboring states and the last broadcast state; determining a norm-free information exchange triggering condition based on the last broadcast state, the current state, and an estimated command; and in response to the current state violating the norm-free information exchange triggering condition, transmitting the current state to the one or more neighboring vehicles.

These and other aspects of the disclosure will become more fully understood upon a review of the drawings and the detailed description, which follows. Other aspects, features, and embodiments of the present disclosure will become apparent to those skilled in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. Similarly, while example embodiments may be discussed below as devices, systems, or methods embodiments it should be understood that such example embodiments can be implemented in various devices, systems, and methods.

BRIEF DESCRIPTION OF THE DRAWINGS

FIG. 7 is a flowchart illustrating an example process for information exchange of a vehicle in a multiagent system according to some embodiments.

DETAILED DESCRIPTION

Figure 1:
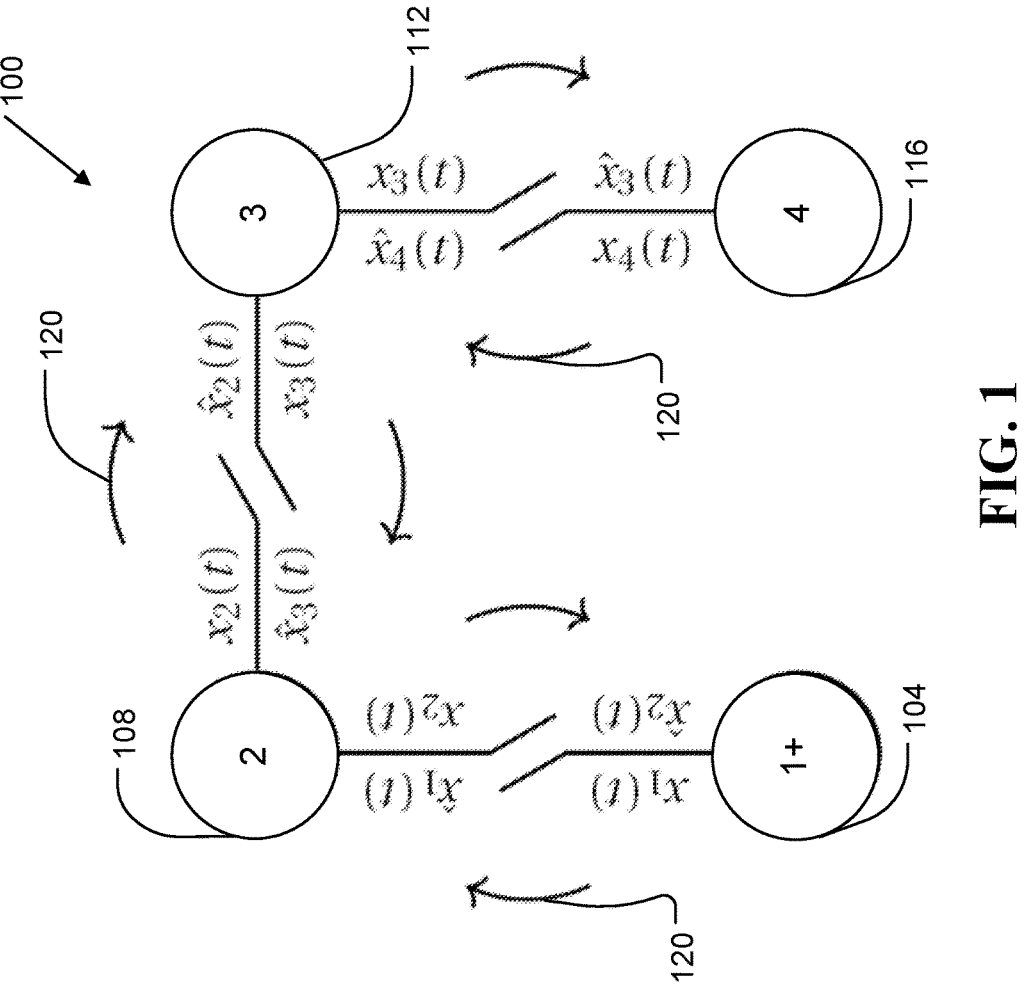
FIG. 1 is an example multiagent system according to some embodiments.

The detailed description set forth below in connection with the appended drawings is intended as a description of various configurations and is not intended to represent the only configurations in which the subject matter described herein may be practiced. The detailed description includes specific details to provide a thorough understanding of various embodiments of the present disclosure. However, it will be apparent to those skilled in the art that the various features, concepts and embodiments described herein may be implemented and practiced without these specific details. In some instances, well-known structures and components are shown in block diagram form to avoid obscuring such concepts.

Multiagent systems are computerized systems that comprise multiple interacting intelligent agents. The interacting agents may be used, for example, to solve problems that are difficult or impossible for an individual agent or a monolithic system to solve. Examples of multiagent systems are groups of interacting aerial drones, and other robotic agents that interact with one another.

In some multiagent systems, control of the interacting agents is done via a distributed control scheme. Reducing the agent-to agent information exchange in a distributed control of a multiagent system can be achieved by a norm-free and adaptive event-triggering rule for each agent, where the multiagent system is decentralized and predicated on a solution-predictor curve method. The decentralized feature provides the proposed event-triggering rule to depend on its own error signals of an agent without acquiring any neighboring or global information. The norm-free feature provides a left side of the proposed event-triggering rule inequality to not be dependent on absolute values of error signals also known as distance, to enable reduction of agent-to-agent information exchange.

Traditionally, a local nature of information exchange between agents is appreciated in a feedback control more than a global nature of information exchange. The significantly increased communication, reduced security, and low feasibility between all agents makes global nature of information exchange less desirable in the development of distributed control architectures. Distributed control architectures comprise a continuous agent-to-agent information exchange or a periodic agent-to-agent information exchange which may result in network overload and excessive usage of energy sources of each agent. An event-triggered control theory mitigates excessive use of energy sources and network overload of the continuous and/or periodic information exchange in an aperiodic and asynchronous way. The control architectures of the event triggered control theory includes a norm (e.g., absolute values or Euclidian norms of error signals). Reducing the norm or making the system norm-free enables a smaller number of events and reduction in information change.

In the present disclosure, methods and systems including a norm-free and an adaptive event triggering rule can reduce agent-to-agent information exchange in distributed control of multiagent systems. Specifically, the norm free and the adaptive event triggering rule can be decentralized and predicated on the solution-predictor curve method. In order to introduce norm free and decentralized features, an adaptive term is utilized in the event triggering rule to estimate unknown variable unavailable to the agent. The adaptive term can be utilized in the event-triggering rule for each agent to estimate an unknown variable. The unknown variable is a time-varying command and is available to a subset of agents (e.g., leader agents) to control all agents of the multiagent system accordingly to the time-varying command. The estimation of the unknown variable is enabled by a solution-predictor curve method. The solution-predictor curve method provides further reduction of agent-to-agent information exchange by allowing each agent to store the curve and exchanges the parameters when an event occurs in a distributed manner for approximating the solution trajectory of each agent. The solution-predictor curve method enables reduction of agent-to-agent information exchange where each agent stores the curve and exchange the parameters for approximating the solution trajectory of each agent. when an event occurs rather than standard sampled data exchange.

A generic event triggering rule comprising absolute values is shown below in equation 1.

$$|a(t)| \le |b(t)| + c(t) \qquad \text{Equation 1}$$

where $|a(t)|$ and $|b(t)|$ are absolute values with scalar properties, and $c(t)$ being a non-negative-definite scalar. When the relationship between a left side of the equation and a right side of the equation is violated, a dynamic system sends new information. The absolute values of $|a(t)|$ and $|b(t)|$ are considered to be a norm, and the left side of the equation comprising the term $|a(t)|$ may be replaced by $a(t)$ to form a norm-free dynamic system. Then, the possible negative value of $a(t)$ can result in less number of events, and therefore, better information exchange reduction since Equation 1 does not get violated for sufficiently large negative numbers of $a(t)$. The norm-free feature enables the left side of the proposed event-triggering rule inequality to be independent on distances such as absolute values of error signals to allow better agent-to-agent information exchange reduction.

In the present disclosure, $\mathbb{Z}$, $\mathbb{Z}_+$, and $\overline{\mathbb{Z}}_+$ respectively denote the sets of integers, positive integers, and nonnegative integers; $\mathbb{R}$, $\mathbb{R}^n$, and $\mathbb{R}^{n\times m}$, respectively denote the sets of real numbers, $n\times 1$ real vectors, and $n\times m$ real matrices; $\mathbb{R}$, $\overline{\mathbb{R}}_+$, $\mathbb{R}_+^{n\times m}$, and $\overline{\mathbb{R}}_+^{n\times m}$, respectively denote the sets of positive real numbers, nonnegative real numbers, positive-definite real matrices, and nonnegative-definite real matrices; $0_n$ and $1_n$ respectively denote the $n\times 1$ vectors of all zeros and ones; and "$\triangleq$" denotes the equality by definition. Furthermore, $(\bullet)^T$ denotes transpose, $(\bullet)^{-1}$ denotes inverse, $\|\bullet\|_2$ denotes the Euclidean norm, $\underline{\lambda}(A)$ and $\overline{\lambda}(A)$ respectively denote the minimum and maximum eigen values of the real matrix $A \in \mathbb{R}^{n\times m}$, diag(a) denotes the diagonal matrix with the real vector $a \in \mathbb{R}^n$ on its diagonal, and $[A]_{ij}$ denotes the entry of the real matrix $A \in \mathbb{R}^{n\times m}$ on the ith row and jth column, $i=1, \ldots, n$, $j=1, \ldots, m$.

A graph theory is a study of graphs that includes mathematical structures to model pairwise relations between objects. The graphs are made of vertices or nodes that are connected by edges or lines and the graph G can include a pair (V, E) where V is the set of vertices and E is the set of edges. The graphs can include an undirected graph where edges link two vertices symmetrically and a direct graph where edges link two vertices asymmetrically. In the present disclosure, undirected graph G is defined by $V_G=\{1, \ldots, n)\}$, which are set of nodes or vertices and $E_G \subset V_G \times V_G$, which are set of edges. The nodes i and j are neighbors when $(i,j) \in E_G$ and the neighboring relationship is represented by i~j. Additionally, the graph G is connected when there is a finite amount of path between $i_0 \ldots i_L$ with $i_{k-1}$~$i_k$ where $k=1, \ldots, L$ between two distinct nodes. The graph includes a degree matrix provided by the given form as shown in equation 2.

$$D(G) \triangleq \text{diag}(d), d = [d_1, \ldots, d_n]^T \qquad \text{Equation 2}$$

where $d_i$ denotes the number of neighboring node i, diag(d) denotes the diagonal matrix with a real vector on its diagonal, $\triangleq$ denotes the equality by definition, and T denotes the transpose. An adjacency matrix $A(G) \in \mathbb{R}^{n\times n}$ of G has entries $[A(G)]_{ij}=1$ when $(i,j) \in E_G$ and $[A(G)]_{ij}=0$ otherwise. A Laplacian matrix of graph G is provided in equation 3 with respect to multi agent systems over the connected and undirected graph G. In some examples, the present disclosure uses multiagent systems over the connected and undirected graph G.

$$\mathcal{L}(G) \triangleq D(G) - A(G) \qquad \text{Equation 3}$$

A lemma is a proposition which is used as a steppingstone to a larger result in informal logic mapping and may be referred to as a helping theorem or an auxiliary theorem. In the present disclosure, three lemmas are used. A first lemma or the Laplacian matrix includes a diagonal matrix K=diag (k) with real vectors on its diagonal, $k=[k_1, \ldots, k_n]^T$, $k_i \in \overline{\mathbb{Z}}_+$, a set of nonnegative integers, $i=1, \ldots, n$, and that at least one $k_i \ne 0$. The first lemma can be expressed by the given form as shown in equation 4 and 5.

$$F(G) \triangleq L(G) + K \in \mathbb{R}_+^{n\times n} \qquad \text{Equation 4}$$

$$F^{-1}(G) \in \mathbb{R}_+^{n\times n} \qquad \text{Equation 5}$$

where $\mathbb{R}_+^{n\times n}$ denotes positive definite real matrices, and $F^{-1}$ denotes inverse of F.

A second lemma or the Young's inequality can be expressed by the given form as shown in equation 6.

$$x^T y \leq \frac{\rho}{2} x^T x + \frac{1}{2\rho} y^T y \qquad \text{Equation 6}$$

where $x \in \mathbb{R}^n$, $y \in \mathbb{R}^m$, and $p \in \mathbb{R}^+$. $\mathbb{R}^n$ denotes $n \times 1$ real vectors, $\mathbb{R}^m$ denotes $m \times 1$ real vectors, and $\mathbb{R}^+$ denotes set of real positive numbers.

A third lemma or the comparison principle includes a dynamical system given by the equation 7 shown below.

$$\hat{v}(t) = f(t, \hat{v}(t)), \ \hat{v}(0) = \hat{v}_0 \qquad \text{Equation 7}$$

where $\hat{v}(t) \in \mathbb{R}$ and $f(t, \hat{v}(t))$ being continuous in time t and locally Lipschitz in $\hat{v}(t)$ for all $t \in \overline{\mathbb{R}}_+$ and all $\hat{v}(t) \in R \subset \mathbb{R}$. A maximum interval of existence of the solution $\hat{v}(t)$ is $[0, T)$ and $\hat{v}(t) \in \mathbb{R}$ for all $t \in [0, T)$. Additionally, a continuous function is denoted as $v(t)$ and satisfies the condition shown by the equation 8 shown below.

$$\hat{v}(t) \leq f(t, v(t)), \ v(0) \leq \hat{v}_0 \qquad \text{Equation 8}$$

By applying the maximum interval of existence relationship including $\hat{v}(t) \in R$ for all $t \in [0, T)$ to equation 8, the continuous function is expressed by the given form as shown in equation 9, and for all $t \in [0, T)$, T may be infinity.

$$v(t) \leq \hat{v}(t) \qquad \text{Equation 9}$$

A connected and undirected graph G can include multiple agents that are denoted by n. A leader agent can be a subset of the multiple agents and has the knowledge of a bounded time-varying command c(t) that has a piecewise continuous function and bounded time rate of change. A follower agent can be a remain set of the multiple agents that do not have the knowledge of this command.

The dynamics of agent i, for i=1, . . . , n, is given by the equation 10 shown below.

$$\dot{x}_i(t) = u_i(t), \ x_i(0) = x_{i0} \qquad \text{Equation 10}$$

where $x_i(t) \in \mathbb{R}$ is the state and $u_i(t) \in \mathbb{R}$ is the control signal. The control signal of agent i, for i=1, . . . , n, can be expressed by equation 11 shown below.

$$u_i(t) = -\sum_{i \sim j} (\hat{x}_i(t) - \hat{x}_j(t)) - k_i(\hat{x}_i(t) - c(t)) \qquad \text{Equation 11}$$

where $k_i=1$ for the leader agents and $k_i=0$ for the follower agents, and $\hat{x}_i(t) \in \mathbb{R}$ being the latest broadcast of $x_i(t)$ of agent i for an event-triggering approach. The following control signal would enable all agents to approach the command with reduced agent-to-agent information exchange.

The unknown variable providing the time-varying command to the leader agent allows an adaptive event-triggering rule to reduce agent-to agent information exchange by providing an estimate of the command. The adaptive event triggering rule for agent i, for i=1, . . . , n, is expressed by the given form as shown in equation 12.

$$(x_i(t) - \hat{w}_i(t))(x_i(t) - \hat{x}_i(t)) \leq \mu((x_i(t) - \hat{w}_i(t))^2 \qquad \text{Equation 12}$$

where $\mu \in [0,1)$ and $\mu$ denotes an event-triggering threshold constant and $\hat{w}_i(t)$ is expressed by equation 12 as(shown below.

$$\dot{\hat{w}}_i(t) = -\gamma_i((x_i(t) - \hat{x}_i(t)) + 2\mu(\hat{w}_i(t) - x_i(t))), \ \hat{w}_i(0) = \hat{w}_{i0} \qquad \text{Equation 13}$$

where $\gamma_i \in \mathbb{R}_+$ and $\gamma_i$ denotes the adaptation gain. $\hat{w}_i(t)$ is the adaptive term utilized to provide an estimate of command c(t) for $\hat{w}_i(t) \in \mathbb{R}$.

Referring back to equation 1, the equation resembles similar configuration of equation 12 including the left side of the equation and the right side of the equation. The left side of equation 12 does not depend on the absolute values of the error signals. For example, if the left side of the equation 12 is negative, it is not possible to violate the relationship, which enables better information exchange reduction. The only condition to violate the relationship takes place when the left side of the equation 12 is positive and is larger than the ride side of the equation 12. Therefore, the event-trigger rule provided by equation 12 may be broadened and considered for the proposed scenarios.

A first scenario is the standard sampled data exchange method that depends on the zero-order-hold operator. A first method of the first scenario describes for agent i, for i=1, . . . , n, broadcasts a sampled data of a state value denoted as $x_i(t)$ through a zero-order-hold operator to its neighbors when the event-triggering rule given by equation 12 is violated when $\hat{x}_i(t) = x_i(t_{di})$ for $t \in t_{di}$, $t_{(d+1)i}$. To state a second scenario predicated on the solution-predictor curve method, $$\hat{x}_i(t) \triangleq x_i(t)$$

(since each agent has continuous access to its own state), $$\hat{x}_j \triangleq x_j(t_j^e), \text{ and } r \triangleq c(t_i^e)$$

can be used where $t_i^e$ is the time when equation 12 is violated for agent i and $t_j^e$ is the time when equation 12 is violated for agent j subject to i~j. The trajectory agent i can be approximated by explicitly solving equation 10 and equation 11 in time domain. Solving equation 10 and 11, a local solution-predictor curve agent i, for i=1, . . . , n, satisfies $$\xi_i(t) \triangleq \exp(Q_i(t - t_i^e))x_i(t_i^e) + \frac{B_i}{Q_i}(1 - \exp(Q_i(t - t_i^e))) \qquad \text{Equation 14}$$

where $$B_i \triangleq \sum_{k \sim j} \hat{x}_j + k_i r, \ Q_i = k_i + d_i \qquad \text{Equation 15}$$

Referring to equation 14, each agent i stores for all of its neighbors and before the next even occurs, agent i can use for i~j instead for using the last received sampled data.

A second scenario can be predicated on the solution-predictor curve method. In the second scenario, agent i, for i=1, . . . , n, can broadcast a solution-predictor curve of a state value denoted as $x_i(t)$ to its neighbors when the event-triggering rule given by equation 12 is violated when $\hat{x}_i(t) = \xi_i(t)$ for $t \in t_{di}$, $t_{(d+1)i}$. In contrast to standard sampled data exchange method from the first scenario, the solution-predictor curve method has the ability to further reduce agent-to-agent information exchange since the solution predictor curve method does not rely on a constant but rather relies on a time varying $\hat{x}_i(t)$, which approximates the solution of agent i, for i=1, . . . , n.

FIG. 1 illustrates an example of a multiagent system 100 consisting of a first agent 104, a second agent 108, a third agent 112, and a fourth agent 116 which graphically illustrates the event-triggering scenarios for the first and second method. An agent-to-agent information exchange 120 can be predicated on event-triggering scenarios stated in the first scenario. The first agent 104 is the leader agent, and the other agents 108, 112, 116 are the follower agents.

A distributed control architecture can be provided by equation 11 of the present disclosure along with the proposed norm-free and adaptive event triggered rule provided by equation 12 and 13. Based on equation 11, 12 and 13, a system-theoretical analysis for the sampled data exchange case of the first method and the data exchange predicated on the solution-predictor curve of the second method is described below by incorporating equation 10 into equation 11:

$$\dot{x}_i(t) = -\sum_{i\sim j}(x_i(t) - x_j(t) - k_i(x_i(t) - c(t)) + \qquad \text{Equation 16}$$

$$\sum_{i\sim j}((x_i(t) - \hat{x}_i(t)) - (x_j(t) - \hat{x}_j(t))) + k_i(x_i(t) - \hat{x}_i(t))$$

The error between the state of agent i, for i=1, . . . , n and the command is described a $$e_i(t) \triangleq x_i(t) - c(t).$$

Incorporating the error between the state agent and the command to equation 16, a time derivative of error is described as:

$$\dot{e}_i(t) = \qquad \text{Equation 17}$$

$$\sum_{i\sim j}(e_i(t) - e_j(t)) - k_i e_i(t) + \sum_{i\sim j}((x_i(t) - \hat{x}_i(t) - (x_j(t) - \hat{x}_j(t))) +$$

$$k_i(x_i(t) - \hat{x}_i(t)) - \dot{c}(t), \, e_i(0) = e_{i0}$$

where $e_{i0}=x_{i0}-c(0)$. In view of equation 4, with K=diag(k) and $k=[k_1 \ldots k_n]^T$, equation 17 can be further described as:

$$\dot{e}_i(t) = -F(G)e(t) + G(G)(x(t) - \hat{x}(t)) - \rho(t), \, e(0) = e_0 \qquad \text{Equation 18}$$

where $$x(t) \triangleq [x_1(t), \ldots, x_n(t)]^T \in \mathbb{R}^n, \, \hat{x}(t) \triangleq [x_1(t), \ldots, x_n(t)]^T \in \mathbb{R}^n,$$

$$\rho(t) \triangleq 1_n \dot{c}(t), \text{ and } e_0 \triangleq [e_{10}(t), \ldots, e_{1n}(t)]^T \in \mathbb{R}^n.$$

The error between the adaptive term and command is defined as $$\tilde{w}_i(t) \triangleq \hat{w}_i(t) - c(t)$$

and is described as:

$$\dot{\tilde{w}}_i(t) = -\gamma((x_i(t) - \hat{x}_i(t) + 2\mu(\hat{w}_i(t) - x_i(t))) - \dot{c}(t), \, \tilde{w}_i(0) = w_{i0} \qquad \text{Equation 19}$$

where $\tilde{w}_i(0) = \hat{w}_i(0) - c(0)$.

Equation 20 and 21 are defined below to provide background information regarding a first theorem. Equation 20 is described as:

$$v(e(t), \tilde{w}(t)) \triangleq \frac{1}{2}e^T(t)F^{-1}(G)e(t) + \frac{1}{2}\tilde{w}^T(t)\Gamma^{-1}\tilde{w}(t) \qquad \text{Equation 20}$$

where $$\tilde{w}(t) \triangleq [\tilde{w}_1(t), \ldots, \tilde{w}_n(t)]^T \in \mathbb{R}^n \text{ and } \Gamma \triangleq \text{diag}([\gamma_1, \ldots, \gamma_n]^T).$$

Equation 21 is described as:

$$a \triangleq \min\{2a_1/\bar{\lambda}(F^{-1}(G)), 2a_2/\bar{\lambda}(\Gamma^{-1})\} \qquad \text{Equation 21}$$

where we define $$a1 \triangleq 1 - \mu - 1/(2h_1),$$

$h_1 \in \mathbb{R}_+$ being an arbitrary to ensure $a_1 \in \mathbb{R}_+$ and $$a2 \triangleq \mu - 1/(2h_2),$$

$h_2 \in \mathbb{R}_+$ being an arbitrary to ensure $a_2 \in \mathbb{R}_+$. The time-varying command c(t) is bounded by time rate of change and satisfies both $\|F^{-1}(G)\rho(t)\|_2^2 \leq \rho_1$ and $\|\rho(t)\|_2^2 \leq \rho_2$, where $\rho_1 \in \mathbb{R}_+$, $\rho_2 \in \mathbb{R}_+$, and $$\rho_0 \triangleq \rho_1 \Delta/(2h_1) + \rho_2/(2h_1).$$

The first theorem is directed to a multiagent system consisting of a plurality of agent denoted as n, over a connected and undirected graph G. The distributed control architecture defined by equation 11 with the norm-free and adaptive event-triggering rule provided by equation 12 and 13. The solution of the close-loop multiagent system may be described as:

$$v(e(t), \tilde{w}(t)) \leq v(e(0), \tilde{w}(0))e^{-\alpha t} + \frac{\rho_0}{\alpha} \qquad \text{Equation 22}$$

The solution of the closed-loop multiagent system described in equation 22 is globally exponentially stable when c(t) is constant as is described as:

$$\lim_{t\to\infty}(e(t), \tilde{w}(t)) = (0,0) \qquad \text{Equation 23}$$

The first portion of the equation 20 may be expressed as below:

$$v_1(e(t)) \triangleq \frac{1}{2}e^T(t)F^{-1}(G)e(t) \qquad \text{Equation 24}$$

The derivative of equation 24 with respect to time is described below:

$$\dot{v}_1(e(t)) = -\|e(t)\|_2^2 + e^T(t)(x(t) - \hat{x}(t)) = -e^T(t)F^{-1}(G)\rho(t) \qquad \text{Equation 25}$$

The event-triggering rule is described as $$e_i(t)((x_i(t) - \hat{x}_i(t)) = (x_i(t) - \hat{w}_i(t))(x_i(t) - \hat{x}_i(t)) + \tilde{w}_i(x_i(t) - \hat{x}_i(t)) \qquad \text{Equation 26}$$

The event-triggering rule expressed by equation 12 and 16 can be upper bounded as:

$$e_i(t)((x_i(t) - \hat{x}_i(t)) \le \mu(x_i(t) - \hat{w}_i(t))^2 + \tilde{w}_i(x_i(t) - \hat{x}_i(t)) \qquad \text{Equation 27}$$

The right-hand side of the equation $\mu(x_i(t) - \hat{w}_i(t)))^2$ can be described as:

$$\mu(x_i(t) - \hat{w}_i(t))^2 = \mu(\tilde{w}_i(t) - e_i(t))^2 \qquad \text{Equation 28}$$

Incorporating equation 26 with 27, equation 25 can be rewritten as:

$$\dot{v}_1(e(t)) \le -\|e(t)\|_2^2 + \sum_{i=1}^{n} \tilde{w}_i((x_i(t) - \hat{x}_i(t)) + \mu(\tilde{w}_i(t) - 2e_i(t))) + \qquad \text{Equation 29}$$

$$\sum_{i=1}^{n} \mu e_i^2(t) - e^T(t)F^{-1}(G)\rho(t) =$$

$$-(1 - \mu)\|e(t)\|_2^2 + \sum_{i=1}^{n} \tilde{w}_i(t)((x_i(t) - \hat{x}_i(t)) + \mu(\hat{w}_i(t) - x_i(t))) -$$

$$\sum_{i=1}^{n} \mu \tilde{w}_i(t)e_i(t) - e^T(t)F^{-1}(G)\rho(t)$$

where the term $-\mu\tilde{w}_i(t)e_i(t)$ may be described as:

$$-\mu\tilde{w}_i(t)e_i(t) = -\mu\tilde{w}_i(t)(x_i(t) - \hat{w}_i(t)) - \mu\tilde{w}_i^2(t) \qquad \text{Equation 30}$$

Incorporating equation 29 and 30, equation 29 may be rewritten as:

$$\dot{v}_1(e(t)) \le -(1 - \mu)\|e(t)\|_2^2 - \mu\|\tilde{w}(t)\|_2^2 + \qquad \text{Equation 31}$$

$$\sum_{i=1}^{n} \tilde{w}_i(t)((x_i(t) - \hat{x}_i(t)) + 2\mu(\hat{w}_i(t) - x_i(t))) - e^T(t)F^{-1}(G)\rho(t)$$

Further, the second portion of the equation 20 may be expressed as below:

$$v_2(\tilde{w}(t)) = \tfrac{1}{2}\tilde{w}^T(t)\Gamma^{-1}\tilde{w}(t) \qquad \text{Equation 32}$$

Incorporating the first portion and the second portion $v(e(t), \tilde{w}(t)) = v_1(e(t)) + v_2(\tilde{w}(t))$, a Lyapunov-like function is provided similar to equation 20. With respect to the first lemma provided above, $v(e(t), \tilde{w}(t)) \in \mathbb{R}_+$ as $v(e(t), \tilde{w}(t))$ is radially unbounded. By taking a derivative of equation 20 with respect to time:

$$\dot{v}(e(t), \tilde{w}(t)) \le -(1 - \mu)\|e(t)\|_2^2 - \mu\|\tilde{w}(t)\|_2^2 - e^T(t)F^{-1}(G)\rho(t) - \tilde{w}^T(t)\Gamma^{-1}\rho(t) \qquad \text{Equation 33}$$

Incorporating the second lemma for $-e^T(t)F^{-1}(G)\rho(t) - \tilde{w}^T(t)\Gamma^{-1}\rho(t)$:

$$\dot{v}(e(t), \tilde{w}(t)) \le -a_1\|e(t)\|_2^2 - a_2\|\tilde{w}(t)\|_2^2 + \rho_0 - av(e(t), \tilde{w}(t)) + \rho_0 \qquad \text{Equation 34}$$

By incorporating the third lemma, equation 22 may be derived. For time-varying command c(t) being a constant, $\rho_0 = 0$ in equation 34 and the solution $(e(t), \tilde{w}(t))$ of the closed-loop multiagent system is globally exponentially stable as depicted in equation 23.

The event-triggering rule given by equation 25 for sampled data information exchange or information exchange predicated on the solution predictor curve method for may be different from equation 12 and 13 and the global information exchange is expressed as below:

$$e_i(t)(x_i(t) - \hat{x}_i(t)) \le \mu e_i^2(t) \qquad \text{Equation 35}$$

Equation 35 is dependent on $e_i(t) = x_i(t) - c(t)$ which provides the command that is available only to the leader agents and is unavailable to other agents unless the global information exchange is allowed. It follows that:

$$\dot{v}_1(e(t)) \le -(1 - \mu)\|e(t)\|_2^2 - e^T(t)F^{-1}(G)\rho(t) \qquad \text{Equation 36}$$

where the first theorem and the second and third lemmas define uniform ultimate boundedness when the command is time varying and is globally exponentially stable when the command is constant without the need for an adaptive term.

The global information exchange is not scalable due to significantly increased communication cost, not secure due to exchanging information goals of all agents, and not feasible for cases involving large numbers of agents. In order to mitigate deficiencies listed above, adaptive estimate $\hat{w}_i(t)$ of c(t) is first added an then subtracted from the term $e_i(t)(x_i(t) - \hat{x}_i(t))$ of equation 26 and is described in the first theorem. The introduction of the adaptive term in the event-triggering rule for each agent as provided by equation 12 and 13, both decentralized and norm-free features is enabled simultaneously without relying on any global information.

Referring to FIG. 1, the event triggering approach with four agents on a connected and undirected graph with the first agent being a leader agent and having the knowledge of the command is provided as:

$$c(t) = \begin{cases} A & \text{for } 0 \le t \le 25, \\ A + B & \text{for } 25 \le t \le 50, \\ A - B & \text{for } 50 \le t \le 75, \end{cases} \qquad \text{Equation 40}$$

Where $A = (x_{10} + x_{20} + x_{30} + x_{40})/4$ and B=1.2. The initial condition of the agent is set to be $x_{10} = 3.2$, $x_{20} = 2.3$, $x_{30} = 1.4$, $x_{40} = 0.5$ and $\mu = 0.95$ for the event-triggering rule provided by equation 12. The speed or rate of convergence of the adaptive term provided by equation 13 includes $\gamma_i = 0.85$ and $\gamma_i = 2.5$ for all agents. The sampling time is set to 0.05 seconds that yields to 6000 data points being exchanged without the event-triggering approach.

Figure 2:
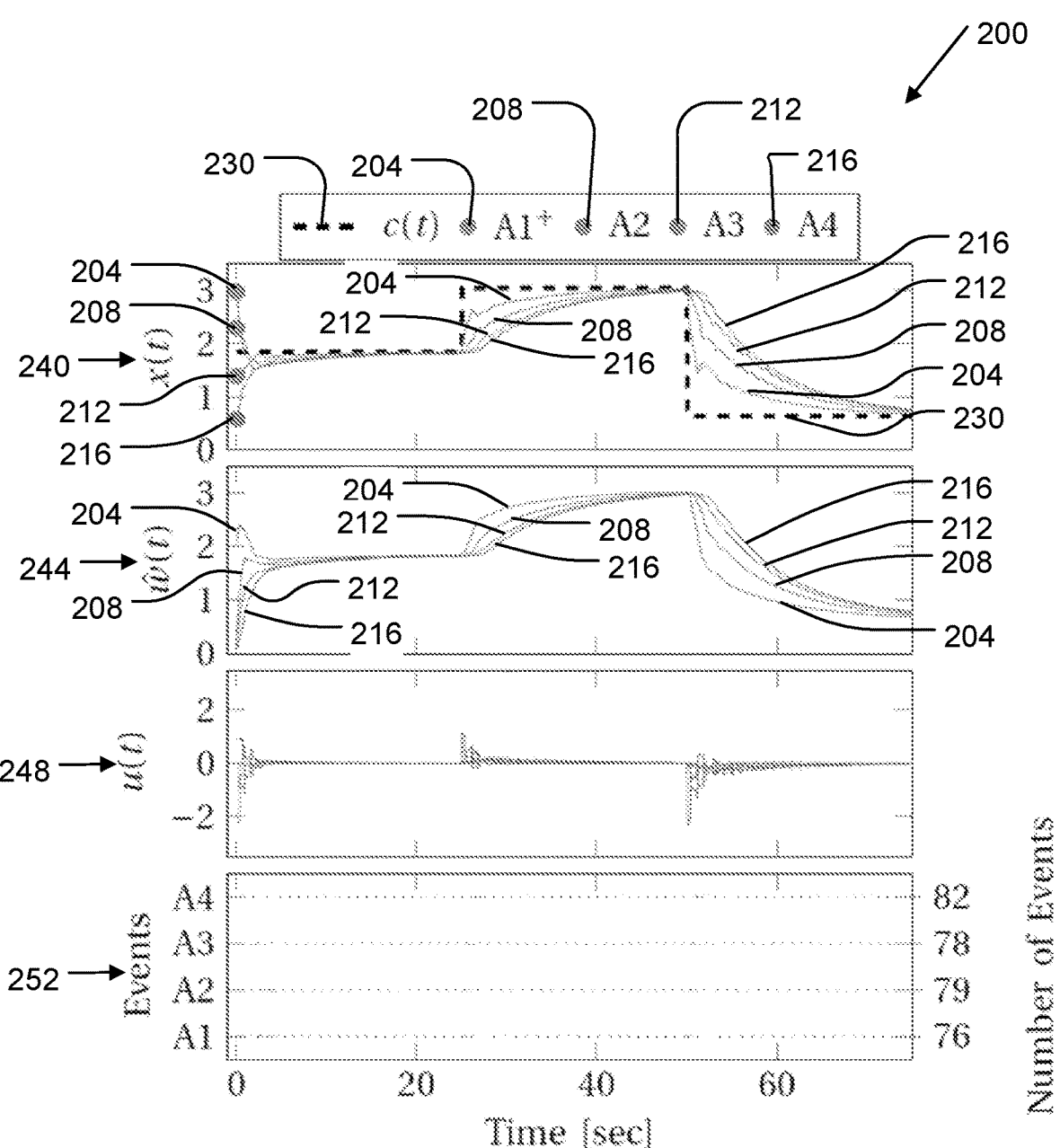
FIG. 2 is a numerical example of the disclosed approach or method while exchanging sampled rate data points with a first learning rate according to some embodiments.
Figure 3:
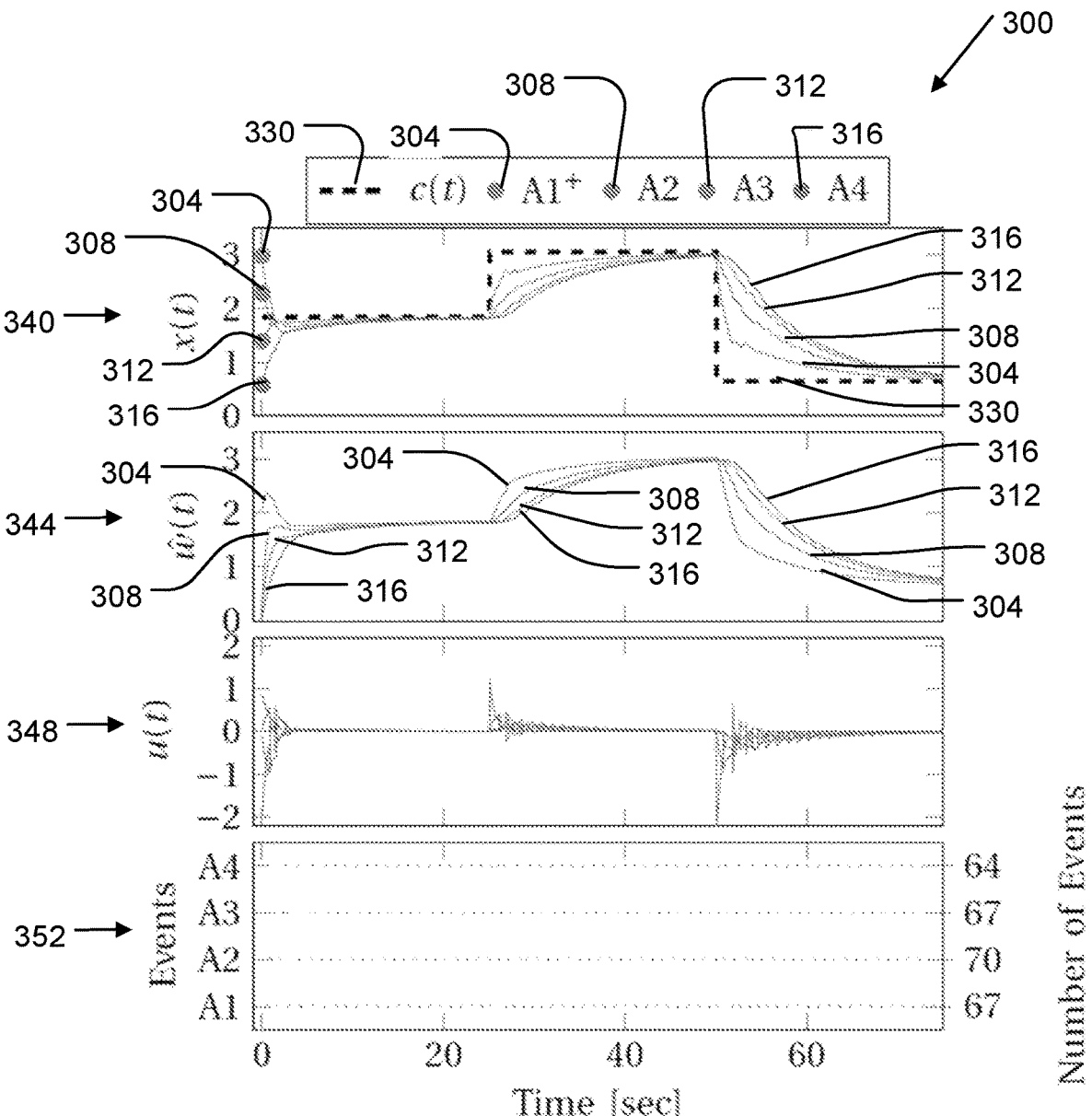
FIG. 3 is a numerical example of the disclosed approach or method while exchanging local solution-predictor curves with the first learning rate according to some embodiments.

FIGS. 2 and 3 illustrates the closed-loop multiagent system 200, 300 response when rate of convergence of the adaptive term provided by equation 13 is set to $\gamma_i = 0.85$. The first agent 204, 304 is represented by A1+, which is a leader agent, the second agent, 208, 308 is represented by A2, the third agent 212, 312 is represented by A3, and the fourth agent 216, 316 is represented by A4. A time varying command 230, 330 is illustrated as dotted lines. FIGS. 2 and 3 includes a first plot 240, 340, a second plot 244, 344, a third plot 248, 348, and a fourth plot 252, 352. The first plot 240, 340 includes the relationship of x(t), which represents a state (e.g., a current state) of the agent, and time (in second). The second plot 244,344 includes the relationship of OW (an adaptive term of the agent) and time (in seconds). The third plot 248,348 includes the relationship of u(t), which represents a control signal of the agent), and time (in seconds). The fourth plot 252,352, includes the relationship of number of events of the first agent 204, 304, the second agent 208, 308, the third agent 212, 312, and fourth agent 216, 316 over a period of time (in seconds).

Figure 4:
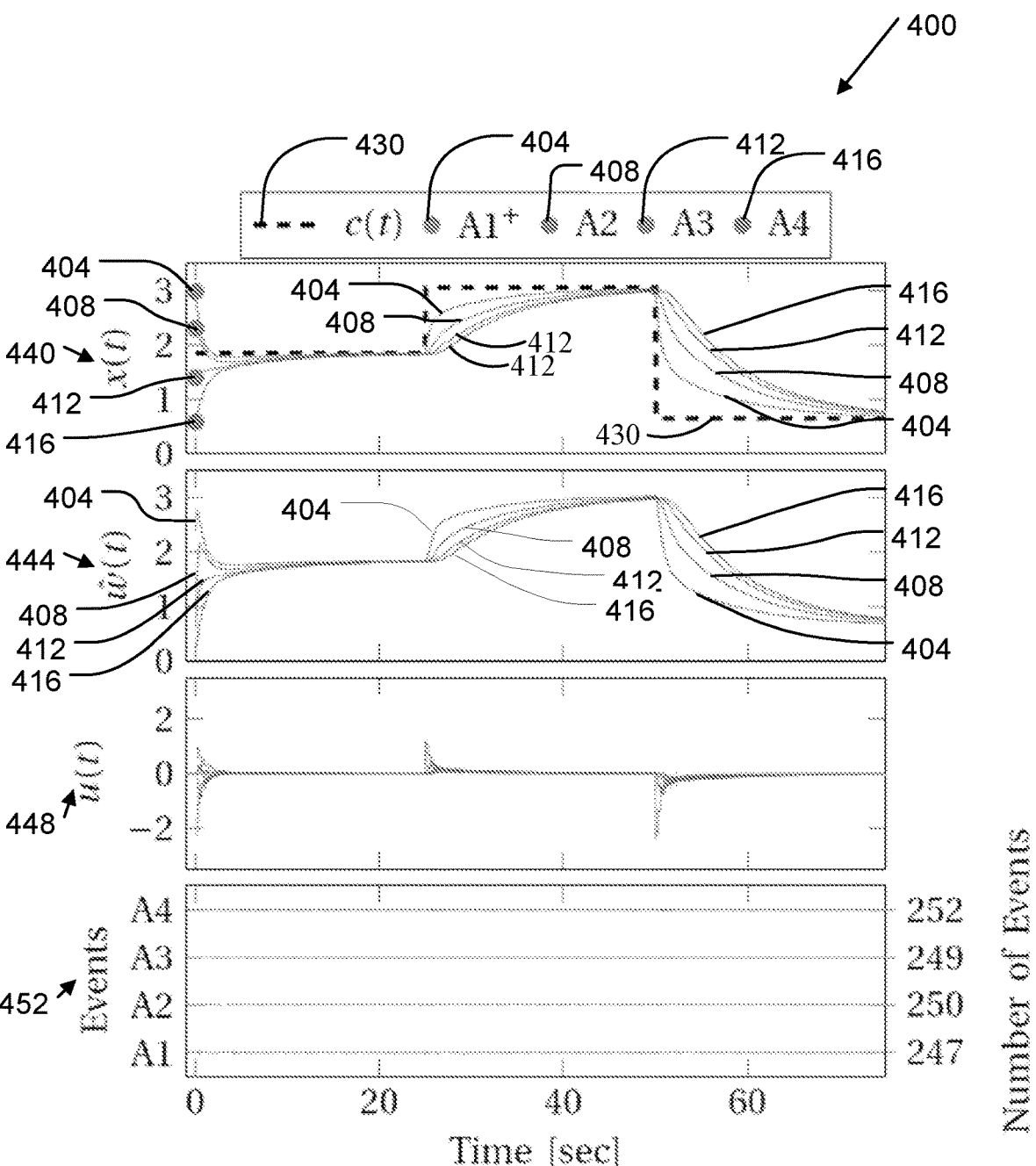
FIG. 4 is a numerical example of the disclosed approach or method while exchanging sampled rate data points with a second learning rate according to some embodiments.
Figure 5:
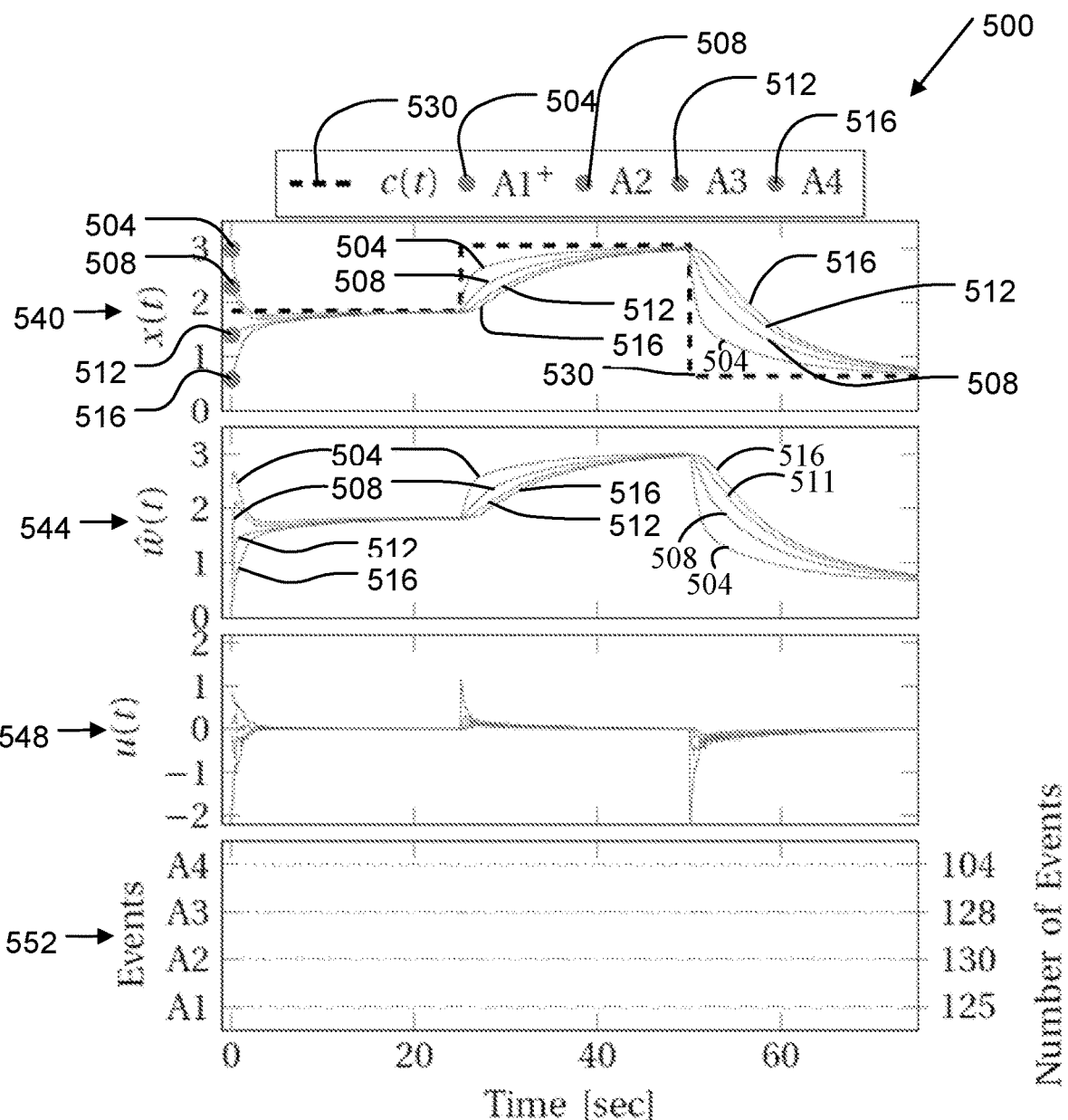
FIG. 5 is a numerical example of the disclosed approach or method while exchanging local solution-predictor curves with the second learning rate according to some embodiments.

FIGS. 4 and 5 illustrates the closed loop multiagent system 400, 500 response when rate of convergence of the adaptive term provided by equation 13 is set to $\gamma_i$=2.5. The first agent 404, 504 is represented by A1+, which is a leader agent, the second agent, 408, 508 is represented by A2, the third agent 412, 512 is represented by A3, and the fourth agent 416, 516 is represented by A4. A time varying command 430, 530 is illustrated as dotted lines. FIGS. 4 and 5 includes a first plot 440, 540, a second plot 444, 544, a third plot 448, 548, and a fourth plot 452, 552. The first plot 440, 540 includes the relationship of x(t) and time (in second). The second plot 444,544 includes the relationship of $\hat{w}$(t) and time (in seconds). The third plot 448,548 includes the relationship of u(t) and time (in seconds). The fourth plot 452,552, includes the relationship of number of events of the first agent 404, 504, the second agent 408, 508, the third agent 412, 512, and fourth agent 416, 516 over a period of time (in seconds).

The lower $\gamma_i$ provides fewer number of events predicated on both the sampled data exchange approach and the solution-predictor curve approach. The lower number of events during the exchange of sampled data points, the solution-predictor method is less effective. Referring to FIGS. 4 and 5 in comparison to FIGS. 2 and 3 for sampled data exchange and solution predictor curve exchange, the system response of the closed-loop multiagent system degrades when using lower values of $\gamma_i$.

The response of the closed-loop multiagent system response improves as the number of events or the y value is increased. The system response of the closed-loop multiagent system degrades when using lower values of $\gamma_i$. increases. Referring to FIGS. 4 and 5, the solution-predictor method becomes significantly effective when number of events increases using sampled data exchange.

Prior systems utilize only the solution-predictor method but do not appreciate or suggest the norm-free and/or the adaptive approach of the presently proposed event-triggering rule. The solution-predictor method without the norm-free and adaptive approach reduced the number of events to 1837 when sampled data exchange is used and the number of events was reduced to 1285 for solution-predictor curve. Referring to FIG. 4, the number of events reduced to 998 events when sampled data exchange is used and referring to FIG. 5, the number of events reduced to 487 events when solution-predictor curve is used. This comparison shows that the presently proposed event-triggering rule with norm-free and adaptive approach provides advantage in further reducing agent-to-agent information exchange. The reduction of agent-to-agent information exchange is enabled due to $\varphi$(t)=0. The event triggering rule of prior art is defined by $\|\bar{\mu}_i(t)\|_2 \leq \varepsilon \|\bar{e}_i(t)\|_2 + \varphi(t)$ where $\varphi(t) \in \mathbb{R}$ is an exponentially decaying term. The presently proposed event-triggering rule does not include a similar term, and $\varphi$(t) may be set to zero.

Reducing agent-to-agent information exchange in distributed control of multiagent system is enabled by a new event-triggering rule. The new event triggering rule is subject to sampled data information exchange or information exchange predicated on the solution-predictor curve method. The decentralized and norm-free feature of the new event-trigger rule includes the adaptive term. The adaptive term utilizes each agent to estimate unknown variables unavailable to a designated agent. Based on the first, second, third lemmas, system-theoretical analysis illustrates that the solution-predictor curve method has the ability to further reduce agent-to-agent information exchange, where each agent stores the curve and exchanges the parameters when an event occurs in a distributed manner for approximating the solution trajectory of each agent.

Figure 6:
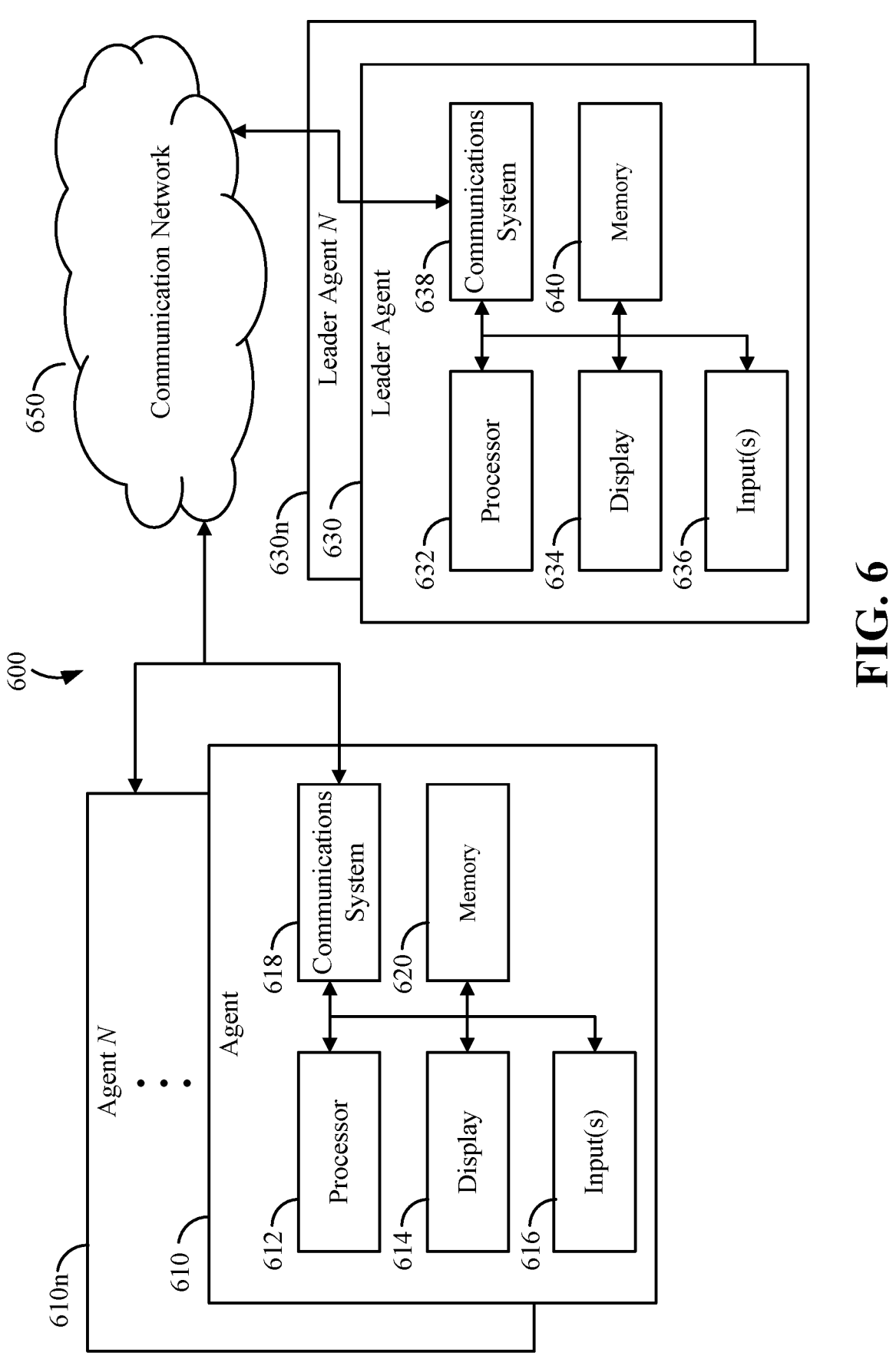
FIG. 6 is a block diagram conceptually illustrating a multiagent system for information exchange according to some embodiments.

FIG. 6 is a block diagram conceptually illustrating a multiagent system for information exchange. For example, the multiagent system 600 can include one or more agents (i.e., follower agents) 610, 610n and one or more leader agents 630, 630n. In some examples, the one or more agents 610, 610n and the one or more leader agents 630, 630n can be connected via a communication network 650 with a connected and undirected graph.

In some examples, the agent 610, 610n can transmit or receive information (e.g., the status of the agent 610, 610n) over a communication network 650. In some examples, the communication network 650 can be any suitable communication network or combination of communication networks. For example, the communication network 650 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard, such as CDMA, GSM, LTE, LTE Advanced, NR, etc.), a wired network, etc. In some embodiments, communication network 650 can be a local area network, a wide area network, a public network (e.g., the Internet), a private or semi-private network (e.g., a corporate or university intranet), any other suitable type of network, or any suitable combination of networks. Communications links between agents 610, 610n, between agents 610, 610n and leader agents 630, 630n, and/or between leader agents 630, 630n can each be any suitable communications link or combination of communications links, such as wired links, fiber optic links, Wi-Fi links, Bluetooth links, cellular links, etc.

In further examples, the agent 610, 610n and/or a leader agent 630, 630n can be a vehicle (e.g., a ground vehicle, an aerial vehicle, an underwater vehicle, a ship, a space vehicle, an autonomous vehicle, a motor vehicle, a space vehicle, car, a train, an unmanned aerial vehicle, a rocket, or a missile, etc.) or any other suitable apparatus or means (e.g., a computing/circuit/electrical node). The agent 610, 610n can include any suitable computing device or combination of devices, such as a processor (including an ASIC, DSP, PFGA, or other processing component) desktop computer, a laptop computer, a smartphone, a tablet computer, a wearable computer, a server computer, a computing device integrated into the vehicle, a camera, a robot, a virtual machine being executed by a physical computing device, etc.

In further examples, the agent 610, 610n can include a processor 612, a display 614, one or more inputs 616, one or more communication systems 618, and/or memory 620. In some embodiments, the processor 612 can be any suitable hardware processor or combination of processors, such as a central processing unit (CPU), a graphics processing unit (GPU), an application specific integrated circuit (ASIC), a field-programmable gate array (FPGA), a digital signal processor (DSP), a microcontroller (MCU), etc. In some embodiments, the display 614 can include any suitable display devices, such as a computer monitor, a touchscreen, a television, an infotainment screen, etc. In some embodiments, the input(s) 616 can include any suitable input devices and/or sensors that can be used to receive user input, such as a keyboard, a mouse, a touchscreen, a microphone, etc.

In further examples, the communications system 618 can include any suitable hardware, firmware, and/or software for communicating information over communication network 650 and/or any other suitable communication networks. For example, the communications system 618 can include one or more transceivers, one or more communication chips and/or chip sets, etc. In a more particular example, the communications system 618 can include hardware, firmware and/or software that can be used to establish a Wi-Fi connection, a Bluetooth connection, a cellular connection, an Ethernet connection, etc. to transmit the status of the agent 610, 610n and/or receive the status of the one or more neighboring agents 610, 610n, 630, 630n.

In further examples, the memory 620 can include any suitable storage device or devices that can be used to store status of the agent 610, 610n, status of the one or more neighboring agents 610, 610n, 630, 630n, a solution predictor curve of the agent 610, 610n, one or more solution predictor curves of the one or more neighboring agents 610, 610n, 630, 630n, data, instructions, values, etc., that can be used, for example, by the processor 612 to perform information exchange tasks via communications system 618, etc. The memory 620 can include any suitable volatile memory, non-volatile memory, storage, or any suitable combination thereof. For example, memory 610 can include random access memory (RAM), read-only memory (ROM), electronically-erasable programmable read-only memory (EE-PROM), one or more flash drives, one or more hard disks, one or more solid state drives, one or more optical drives, etc. In some embodiments, the memory 620 can have encoded thereon a computer program for controlling operation of computing device 610. For example, in such embodiments, the processor 612 can execute at least a portion of the computer program to perform one or more data processing tasks described herein, transmit/receive information via the communications system 618, etc. As another example, processor 612 can execute at least a portion of process 700 described below in connection with FIG. 7.

In even further examples, the multiagent system can include one or more leader agents 630, 630n. A leader agent 630, 630n can include a processor 632, a display 634, input(s) 636, a communication system 638, and/or a memory 640. In some examples, the processor 632, the display 634, the input(s) 636, the communication system 638, and/or the memory 640 of the leader 630, 630n are substantially similar to those in the agent 610, 610n. In addition, the leader 630, 630n can receive a bounded time-varying command (c(t)) which the one or more agents 610, 610n and the one or more leader agents 630, 630n are to follow. In some examples, the one or more agents 610, 610n may not access or know the command (c(t)). In other examples, the command (c(t)) can be available to the one or more agents 610, 610n.

FIG. 7 is a flowchart illustrating an example process for information exchange. In some examples, the process 700 for information exchange in a multiagent system may be carried out by the agent 610, 610n and/or the leader agent 630 illustrated in FIG. 6. In some examples, the multiagent system can include multiple homogeneous or heterogeneous agents to communicate each other. An agent 610, 610n, 630 in the multiagent system can include a vehicle (e.g., a ground vehicle, an aerial vehicle, an underwater vehicle, a ship, a space vehicle, an autonomous vehicle, a motor vehicle, a space vehicle, car, a train, an unmanned aerial vehicle, a rocket, or a missile, etc.) operating in a group or team. However, it should be appreciated that the agent 610, 610n, 630 can be any other suitable apparatus or means (e.g., a computing/circuit/electrical node, a robot, a power node in a power grid) for carrying out the functions or algorithm described below. Additionally, although the steps of the flowchart 700 are presented in a sequential manner, in some examples, one or more of the steps may be performed in a different order than presented, in parallel with another step, or bypassed.

At step 702, the process for information exchange of a vehicle in a multiagent system can receive one or more neighboring states broadcast by one or more neighboring vehicles. In some examples, the one or more neighboring states can correspond to the one or more neighboring vehicles. In some examples, a neighboring vehicle (j) can transmit a neighboring state $(\hat{x}_j(t))$ when the neighboring state $(\hat{x}_j(t))$ is an initial state $(\hat{x}_j(0)$ or $(\hat{x}_{j0}))$ or the neighboring state $(\hat{x}_j(t))$ causes violation of an information exchange triggering condition (which is elaborated below in connection with step 708 in detail). Then, the vehicle (i) can receive the neighboring state $(\hat{x}_j(t))$ broadcasted by the neighboring state.

At step 704, the process can transmit a last broadcast state $(\hat{x}_i(t))$ of the vehicle to the one or more neighboring vehicles (j). Each vehicle (i) can transmit its initial state $(x_i(0)$ or $x_{i0})$ to its neighboring vehicle(s) (j) or its state $x_i(t)$ to its neighboring vehicles (j) when the state $(x_i(t))$ causes violation of an information exchange triggering condition. The state of a vehicle and the information exchange triggering condition are explained further in connection with step 706 and 708, respectively below. In some examples, the last broadcast state $(\hat{x}_i(t))$ can be the latest state broadcast or transmitted to the one or more neighboring vehicles (j). In some examples, the last broadcast state $(\hat{x}_i(t))$ can be a constant real value because the last broadcast state can be a state transmitted previously. For example, the last broadcast state $(\hat{x}_i(t))$ of the vehicle (i) at time t can be a state at time t−2 (i.e., $(x_i(t−2))$ because the most recent or latest state of the vehicle (i) transmitted or broadcast is the state at time t−2. In the example, the last broadcast state $(\hat{x}_i(t))$ of the vehicle (i) at time t can be a constant value at time t−2 and t−1. In other examples, the last broadcast state can be a time-varying value (e.g., based on a solution-predictor curve).

At step 706, the process can determine a current state $(x_i(t))$ of the vehicle (i) based on the one or more neighboring states $(\hat{x}_j(t))$ and the last broadcast state $(\hat{x}_i(t))$. In some examples, a state of a vehicle can indicate a location (e.g., Global Positioning System (GPS) position, (x, y) position, (x, y, z) position) of the vehicle, a phase angle in a power system, or an output or a result of a control signal $(u_i(t))$ of the vehicle. For example, when there are n vehicles (i=1, . . . , n), the state of each agent can be defined as: $x_i(t)=u_i(t)$, where the initial state $(x_i(0))$ of each vehicle can be $x_{i0}$. Here, the current state $(x_i(t))$ of the vehicle can be a time-varying real number or value, and $u_i(t)$ is a control signal. In some examples, the control signal $u_i(t)$ can be defined as: $u_i(t)=-\Sigma_{i~j}(\hat{x}_i(t)-\hat{x}_j(t))-k_i(\hat{x}_i(t)-c(t))$, where $\hat{x}_i(t)$ is the last broadcast state of the vehicle (i) at time t, $\hat{x}_j(t)$ is the one or more neighboring states at time t, $k_i=1$ for leader vehicles, $k_i=0$ for follower vehicles, and c(t) is a bounded time-varying command that has piecewise continuous and bounded time rate of change. In some examples, the command is only available to a subset of vehicles (i.e., leader vehicles), and the current states of all vehicles are driven to this command. In a non-limiting scenario, the command can be a certain trajectory (e.g., a path between two points) or a direction to move the vehicles to a specific place. However, it should be appreciated that the command can be any other suitable task for multiple vehicles to perform as an objective (e.g., global objective) of the controlled multiagent system. In further examples, the command is unknown and unavailable to a follower vehicle such that the control signal $u_i(t)$ is determined by $u_i(t) = -\Sigma_{i \sim j}(\hat{x}_i(t) - \hat{x}_j(t))$.

At step 708, the process can determine a norm-free information exchange triggering condition based on the last broadcast state, the current state, and an estimated command. The norm-free information exchange triggering condition can be referred to a norm-free and adaptive event-triggering rule. In some examples, the estimated command can include an estimate of the command such that the current state is driven to follow the command although the command is unavailable and unknown to the vehicle. In further examples, the norm-free information exchange triggering condition can depend on error signals of the vehicle without using neighboring information or global information (e.g., the command). For example, the norm-free information exchange triggering condition can be defined by: $(x_i(t) - \hat{w}_i(t))(x_i(t) - \hat{x}_i(t)) \leq \mu((x_i(t) - \hat{w}_i(t))^2$, where $x_i(t)$ is the current state of the vehicle at time t, $\hat{w}_i(t)$ is the estimated command or adaptive term, $\hat{x}_i(t)$ is the last broadcast state of the vehicle, and $\mu$ is an error scaling parameter. Contrary to convention event-triggering rules in a multiagent system, a negative value of the left side (i.e., $(x_i(t) - \hat{w}_i(t))(x_i(t) - \hat{x}_i(t)))$ in the norm-free information exchange triggering condition can avoid violation of the norm-free information exchange triggering condition. That is, when the left side of the norm-free information exchange triggering condition is negative, it is not possible to violate the norm-free information exchange triggering condition because the right side (i.e., $\mu((x_i(t) - \hat{w}_i(t))^2)$ of the norm-free information exchange triggering condition has only positive values. This can imply better information exchange reduction because the only condition to violate the norm-free information exchange triggering condition is that the left side of the norm-free information exchange triggering condition is positive and larger that the right side of the norm-free information exchange triggering condition.

In some examples, the estimated command can be defined as $\hat{w}_i(t) = -\gamma_i((x_i(t) - \hat{x}_i(t)) + 2\mu(\hat{w}_i(t) - x_i(t)))$, where the initial estimated command (i.e., $\hat{w}_i(0)$) is $\hat{w}_{i0}$, $x_i(t)$ is the current state of the vehicle at time t, $\hat{x}_i(t)$ is the last broadcast state of the vehicle, $\mu$ is the error scaling parameter, and $\gamma_i$ is an adaptive parameter of the vehicle.

At step 710, the process can transmit the current state to the one or more neighboring vehicles in response to the current state violating the norm-free information exchange triggering condition. In some examples, as the current state of the vehicle changes in time domain, the changing current state can determine whether the norm-free information exchange triggering condition is violated. In a non-limiting scenario, the norm-free information exchange triggering condition can be violated when the vehicle moves to an opposite or different direction to or from the direction that the command directs. For example, at time p, the current state can result in $(x_i(p) - \hat{w}_i(p))(x_i(p) - \hat{x}_i(p)) > \mu((x_i(p) - \hat{w}_i(p))^2$ such that the left side of the norm-free information exchange triggering condition is greater than the right side of the norm-free information exchange triggering condition. Then, the norm-free information exchange triggering condition is violated, and the vehicle can transmit the current state $(x_i(p))$ at time p to the one or more neighboring vehicles.

In some scenarios, to transmit the current state to the one or more neighboring vehicles, the process can transmit a sampled dataset of the current state through a zero-order-hold operator to the one or more neighboring vehicles. In some examples, the scenarios depend on the zero-order-hold operator to reconstruct a signal using a digital-to-analog converter (DAC).

In other scenarios, the process can a use solution-predictor curve method to further reduce vehicle-to-vehicle information exchange. For example, the process can further transmit a solution-predictor curve of the current state to the one or more neighboring vehicles for approximating a trajectory of the vehicle in response to the current state violating the norm-free information exchange triggering condition. In some examples, the solution-predictor curve of the current state can be defined as:

$$\xi_i(t) \triangleq \exp(Q_i(t - t_i^e))x_i(t_i^e) + \frac{B_i}{Q_i}(1 - \exp(Q_i(t - t_i^e))),$$

$$\text{where } B_i \triangleq \sum_{k \sim j} \hat{x}_j + k_i r, \, Q_i = k_i + d_i,$$

determines whether an agent is leader or follower, denotes the number of neighbors of an agent, $$\hat{x}_i(t) \triangleq x_i(t), \text{ and } \hat{x}_j \triangleq x_j(t_j^e), \text{ and } r \triangleq c(t_i^e).$$

In further examples, the one or more neighboring states can include one or more solution-predictor curves corresponding to the one or more neighboring vehicles and uses $\xi_j(t)$ as one or more neighboring states broadcast by one or more neighboring vehicles. In even further examples, the process can use $\xi_i(t)$ as the last broadcast state broadcast to one or more neighboring vehicles. Thus, the one or more neighboring states and the last broadcast state can be time-varying real values.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method for information exchange and operation of a vehicle in a multiagent system, the method comprising:
  receiving one or more neighboring states broadcast according to an undirected and connected graph topology by one or more neighboring vehicles;
  transmitting a last broadcast state of the vehicle to the one or more neighboring vehicles;
  operating the vehicle according to a last estimated command corresponding to the last broadcast state;
  determining a current state of the vehicle based on the one or more neighboring states and the last broadcast state, wherein the current state of the vehicle comprises a control signal of the vehicle that is determined by: $u_i(t) = -\Sigma_{i \sim j}(\hat{x}_i(t) - \hat{x}_j(t))$, where $u_i(t)$ is the control signal of the vehicle at time t, $\hat{x}_i(t)$ is the last broadcast state of the vehicle at time t, and $\hat{x}_j(t)$ is the one or more neighboring states;
  determining an estimated command based on the current state;
  determining a norm-free information exchange triggering condition based on the last broadcast state, the current state, and the estimated command;

in response to the current state violating the norm-free information exchange triggering condition, transmitting the current state to the one or more neighboring vehicles; and operating the vehicle according to the estimated command.

2. The method of claim 1, wherein the last broadcast state comprises a constant real value through the zero-order-hold operator or through time-varying real value through solution predictor curve method, and wherein the current state comprises a time-varying real value.

3. The method of claim 1, wherein the last broadcast state is a state of the vehicle most currently transmitted to the one or more neighboring vehicles.

4. The method of claim 1, wherein the estimated command is an estimate of a command such that the current state is driven to follow the command.

5. The method of claim 4, wherein the command is unknown and unavailable to the vehicles entitled followers.

6. The method of claim 1, wherein the norm-free information exchange triggering condition depends on error signals of the vehicle without using indirectly acquired information.

7. The method of claim 1, wherein a negative value of a left side in the norm-free information exchange triggering condition avoids violation of the norm-free information exchange triggering condition.

8. The method of claim 1, wherein the norm-free information exchange triggering condition is defined as:

$(x_i(t)-\hat{w}_i(t))(x_i(t)-\hat{x}_i(t))\leq\mu((x_i(t)-\hat{w}_i(t))^2$, where $x_i(t)$ is the current state at time t, $\hat{w}_i(t)$ is the estimated command, $\hat{x}_i(t)$ is the last broadcast state, and $\mu$ is an error scaling parameter.

9. The method of claim 8, wherein the estimated command is defined as:

$\hat{w}_i(t)=-\gamma_i((x_i(t)-\hat{x}_i(t))+2\mu(\hat{w}_i(t)-x_i(t)))$, where $x_i(t)$ is the current state of the vehicle at time t, $\hat{x}_i(t)$ is the last broadcast state of the vehicle, $\mu$ is an error scaling parameter, and $\gamma_i$, is an adaptive parameter of the vehicle.

10. The method of claim 1, wherein transmitting the current state to the one or more neighboring vehicles comprises: transmitting a sampled dataset of the current state through a zero-order-hold operator to the one or more neighboring vehicles.

11. The method of claim 1, further comprising:

in response to the current state violating the norm-free information exchange triggering condition, transmitting a solution-predictor curve of the current state to the one or more neighboring vehicles for approximating a trajectory of the vehicle.

12. The method of claim 11, wherein the solution-predictor curve of the current state is defined as:

$$\xi(t) \triangleq \exp(Q_i(t-t_i^e))x_i(t_i^e) + \frac{B_i}{Q_i}(1-\exp(Q_i(t-t_i^e))),$$

$$\text{where } B_i \triangleq \sum_{i\sim j}\hat{x}_j + k_i r, \ Q_i = k_i + d_i, \ t_i^e$$

where is a time when the norm-free information exchange triggering condition is violated.

13. The method of claim 1, wherein the one or more neighboring states comprises one or more solution-predictor curves corresponding to the one or more neighboring vehicles.

14. The method of claim 1, wherein the last broadcast state is a time-varying real value.

15. An agent for information exchange and operation of a vehicle, the agent comprising:

a processor; and a memory having stored thereon a set of instructions which, when executed by the processor, cause the processor to:

receive one or more neighboring states broadcast by one or more neighboring vehicles;

transmit a last broadcast state of the agent to the one or more neighboring vehicles;

operate the vehicle according to a last estimated command corresponding to the last broadcast state;

determine a current state of the vehicle based on the one or more neighboring states and the last broadcast state, wherein the current state of the vehicle comprises a control signal of the vehicle that is determined by $u_i(t)=-\Sigma_{i\sim j}(\hat{x}_i(t)-\hat{x}_j(t))$, where $u_i(t)$ is the control signal of the vehicle at time t, $\hat{x}_i(t)$ is the last broadcast state of the vehicle at time t, and $\hat{x}_j(t)$ is the one or more neighboring states;

determine an estimated command based on the current state;

determine a norm-free information exchange triggering condition based on the last broadcast state, the current state, and the estimated command;

in response to the current state violating the norm-free information exchange triggering condition, transmit the current state to the one or more neighboring vehicles; and operate the vehicle according to the estimated command.

16. The agent of claim 15, wherein the last broadcast state comprises a constant real value through the zero-order-hold operator or through time-varying real value through solution predictor curver method, and wherein the current state comprises a time-varying real value.

17. The agent of claim 15, wherein the last broadcast state is a state of the vehicle most currently transmitted to the one or more neighboring vehicles.

18. The agent of claim 15, wherein the estimated command is an estimate of a command such that the current state is driven to follow the command.

19. The agent of claim 18, wherein the command is unknown and unavailable to the vehicles entitled followers.

20. The agent of claim 15, wherein the norm-free information exchange triggering condition depends on error signals of the vehicle without using indirectly acquired information.

21. The agent of claim 15, wherein a negative value of a left side in the norm-free information exchange triggering condition avoids violation of the norm-free information exchange triggering condition.

22. The agent of claim 15, wherein the norm-free information exchange triggering condition is defined as:

$(x_i(t)-\hat{w}_i(t))(x_i(t)-\hat{x}_i(t))\leq\mu((x_i(t)-\hat{w}_i(t))^2$, where $x_i(t)$ is the current state at time t, $\hat{w}_i(t)$ is the estimated command, $\hat{x}_i(t)$ is the last broadcast state, and $\mu$ is an error scaling parameter.

23. The agent of claim 22, wherein the estimated command is defined as:

$\hat{w}_i(t) = -\gamma_i((x_i(t) - \hat{x}_i(t)) + 2\mu(\hat{w}_i(t) - x_i(t)))$, where $x_i(t)$ is the current state of the vehicle at time t, $\hat{x}_i(t)$ is the last broadcast state of the vehicle, $\mu$ is an error scaling parameter, and $\gamma_i$, is an adaptive parameter of the vehicle.

24. The agent of claim 15, wherein transmitting the current state to the one or more neighboring vehicles comprises: transmitting a sampled dataset of the current state through a zero-order-hold operator to the one or more neighboring vehicles.

25. The agent of claim 15, wherein the memory having stored thereon a further set of instructions which, when executed by the processor, cause the processor to:

in response to the current state violating the norm-free information exchange triggering condition, transmit a solution-predictor curve of the current state to the one or more neighboring vehicles for approximating a trajectory of the vehicle.

26. The agent of claim 25, wherein the solution-predictor curve of the current state is defined as:

$$\xi(t) \overset{\triangle}{=} \exp(Q_i(t - t_i^e))x_i(t_i^e) + \frac{B_i}{Q_i}(1 - \exp(Q_i(t - t_i^e))),$$

$$\text{where } B_i \overset{\triangle}{=} \sum\nolimits_{i \sim j} \hat{x}_j + k_i r, Q_i = k_i + d_i,$$

is a time when the norm-free information exchange triggering condition is violated.

27. The agent of claim 15, wherein the one or more neighboring states comprises one or more solution-predictor curves corresponding to the one or more neighboring vehicles.

28. The agent of claim 15, wherein the last broadcast state is a time-varying real value.

* * * * *